US010443856B2

(12) United States Patent
Emmerson et al.

(10) Patent No.: US 10,443,856 B2
(45) Date of Patent: Oct. 15, 2019

(54) WAVE ROTORS WITH TEMPERATURE CONTROL FEATURES

(71) Applicant: Rolls-Royce North American Technologies, Inc., Indianapolis, IN (US)

(72) Inventors: Calvin W. Emmerson, Bloomington, IN (US); Philip H. Snyder, Avon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 1003 days.

(21) Appl. No.: 15/041,182

(22) Filed: Feb. 11, 2016

(65) Prior Publication Data

US 2016/0245526 A1    Aug. 25, 2016

Related U.S. Application Data

(60) Provisional application No. 62/114,916, filed on Feb. 11, 2015.

(51) Int. Cl.
*F23R 3/56* (2006.01)
*F02C 3/02* (2006.01)
(Continued)

(52) U.S. Cl.
CPC ............. *F23R 3/56* (2013.01); *F02C 3/02* (2013.01); *F02C 3/14* (2013.01); *F23C 15/00* (2013.01);
(Continued)

(58) Field of Classification Search
CPC .... F23R 3/56; F23R 3/002; F23R 7/00; F02C 3/14; F02C 3/02; F23C 15/00; F04F 13/00

See application file for complete search history.

(56) References Cited

U.S. PATENT DOCUMENTS

| 1,887,717 A | * | 11/1932 | Koch | .................. F02C 3/16 60/39.35 |
| 2,445,837 A | * | 7/1948 | McKenzie, Jr. | .......... F02C 7/18 415/116 |

(Continued)

FOREIGN PATENT DOCUMENTS

| CH | 348577 A | 8/1960 |
| DE | 4330037 A1 | 3/1995 |

(Continued)

OTHER PUBLICATIONS

Shumaker, R.H and Schrady, D.A., Proceedings of the 1985 ONR/NAVAIR Wave Rotor Research and Technology Workshop, May 1985, 425 pages.

(Continued)

*Primary Examiner* — Ted Kim
(74) *Attorney, Agent, or Firm* — Barnes & Thornburg LLP

(57) ABSTRACT

A wave rotor combustor includes an inlet plate, an outlet plate, and a rotor drum assembly positioned therebetween. The inlet plate is formed to include an inlet port arranged to receive a mixture of fuel and air. The outlet plate is formed to include an outlet port arranged to receive combusted gasses flowing out of the wave rotor combustor. The rotor drum assembly is arranged to rotate relative to the inlet and outlet plates and to combust the fuel and air mixture as part of a combustion process. Conditioned air is passed through the wave rotor combustor to regulate a temperature distribution of the wave rotor combustor.

16 Claims, 8 Drawing Sheets

(51) Int. Cl.
*F23R 7/00* (2006.01)
*F23C 15/00* (2006.01)
*F23R 3/00* (2006.01)
*F02C 3/14* (2006.01)
*F04F 13/00* (2009.01)

(52) U.S. Cl.
CPC ............... *F23R 3/002* (2013.01); *F23R 7/00* (2013.01); *F04F 13/00* (2013.01)

(56) References Cited

U.S. PATENT DOCUMENTS

| | | | |
|---|---|---|---|
| 3,003,315 A * | 10/1961 | Spalding | F02C 3/02 60/39.45 |
| 3,015,937 A * | 1/1962 | Giliberty | F01D 5/18 415/116 |
| 3,019,962 A * | 2/1962 | Spalding | F04F 13/00 60/39.45 |
| 5,522,217 A * | 6/1996 | Zauner | F02C 3/02 60/39.45 |
| 6,449,939 B1 | 9/2002 | Snyder | |
| 6,526,936 B2 | 3/2003 | Nalim | |
| 7,137,243 B2 | 11/2006 | Snyder et al. | |
| 7,526,912 B2 | 5/2009 | Tangirala et al. | |
| 7,621,118 B2 | 11/2009 | Snyder et al. | |
| 8,117,828 B2 | 2/2012 | Snyder et al. | |
| 8,127,533 B2 | 3/2012 | Lu et al. | |
| 8,443,583 B2 | 5/2013 | Nalim et al. | |
| 8,555,612 B2 | 10/2013 | Snyder et al. | |
| 2006/0260291 A1 | 11/2006 | Vandervort et al. | |
| 2014/0123676 A1* | 5/2014 | Jackson | F02C 7/18 60/782 |

FOREIGN PATENT DOCUMENTS

| | | | |
|---|---|---|---|
| GB | 727796 A | 4/1955 | |
| GB | 804528 A * | 11/1958 | F04F 13/00 |
| GB | 820151 A1 | 9/1959 | |
| GB | 996267 A * | 6/1965 | F04F 13/00 |
| WO | 2012092495 A1 | 7/2012 | |

OTHER PUBLICATIONS

Snyder, Philip H., Seal Technology Development for Advanced Component for Airbreathing Engines, Dec. 2008, 138 pages.

Extended European Search Report, European Application No. 16153473.0-1605, dated Jul. 7, 2016, 9 pages.

European Office Action issued in connection with European Application No. 16153473.0-1605, dated Dec. 19, 2017, 4 pages.

* cited by examiner

WAVE ROTORS WITH TEMPERATURE CONTROL FEATURES

CROSS REFERENCE TO RELATED APPLICATIONS

This application claims priority to and the benefit of U.S. Provisional Patent Application No. 62/114,916, filed 11 Feb. 2015, the disclosure of which is now expressly incorporated herein by reference.

FIELD OF THE DISCLOSURE

The present disclosure relates generally to wave rotors, and more specifically to wave rotors with temperature regulating features.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, a mixture including fuel and the high-pressure air is ignited. Products of the combustion reaction in the combustor are directed into the turbine where work is extracted to drive the compressor and, sometimes, an output shaft. Leftover combustion products are exhausted out of the turbine and may provide thrust in some applications.

In some engines, the combustor includes a wave rotor combustor that burns fuel and high-pressure air and discharges combustion products to the turbine to drive rotation of the turbine. Typical wave rotor combustors include an inlet plate, an outlet plate spaced apart from the inlet plate along a central axis of the wave rotor combustor, and a rotor drum positioned between the plates. The inlet plate provides an inlet port through which a flow of air and fuel pass into rotor passages formed in the rotor drum. The rotor drum receives and combusts the fuel-air mixture to produce hot high-pressure products as the rotor drum rotates about the central axis. The outlet plate provides an outlet port for the hot high-pressure products to exit the wave rotor combustor.

SUMMARY

The present disclosure may comprise one or more of the following features and combinations thereof.

A wave rotor combustor may include an inlet plate, an outlet plate, and a rotor drum assembly. The inlet plate may be formed to include an inlet port that extends circumferentially along an arc about a central axis of the wave rotor combustor. The outlet plate may be formed to include an exit port that extends circumferentially along an arc about the central axis. The rotor drum assembly may be mounted for rotation relative to the inlet and outlet plates about the central axis.

The rotor drum assembly may include an outer tube that extends along the central axis, an inner tube positioned radially between the outer tube and the central axis, and a plurality of webs extending radially between and interconnecting the outer and inner tubes to form a plurality of rotor passage. Each web may be formed to include a plurality of fluid flow passages extending through the web and adapted to receive conditioned air to regulate a temperature distribution of the rotor drum assembly.

In some embodiments, each web may include a radial outer surface and a radial inner surface located radially between the radial outer surface and the central axis. The radial inner surface may include a plurality of web inlet apertures opening into the fluid flow passages. The radial outer surface may include a plurality of web outlet apertures opening into the fluid flow passages. In some embodiments, the fluid flow passages may be nonlinear.

In some embodiments, the rotor drum assembly may include a forward end and an aft end spaced apart axially from the forward end along the central axis. Each web may further include an aft sidewall extending between and interconnecting the radial outer and radial inner surfaces at the aft end. Each web may be formed to include an exhaust passage extending between the radial inner surface and the aft sidewall.

In some embodiments, the radial inner surface may be formed to include an exhaust inlet aperture opening into the exhaust passage. The aft sidewall may be formed to include a plurality of exhaust outlet apertures opening into the exhaust passage.

In some embodiments, the outer tube may be formed to include a plurality of outer openings that extend through the outer tube radially. The outer openings may be spaced apart axially relative to the central axis. Each outer opening may be aligned with and opens into a fluid flow passage.

In some embodiments, the inner tube may be formed to include a plurality of inner openings that extend through the inner tube radially. The inner openings may be spaced apart axially relative to the central axis. Each inner opening may be aligned with and open into a fluid flow passage.

In some embodiments, the rotor drum assembly may include an insert body extending along the central axis and positioned radially between the inner tube and the central axis. The insert body and the inner tube may cooperate to form a first chamber in fluid communication with the fluid flow passages.

In some embodiments, the rotor drum assembly may include a drum sleeve extending along the central axis to position the outer tube between the drum sleeve and the inner tube. The drum sleeve and the outer tube may cooperate to form a second chamber in fluid communication with the fluid flow passages to allow air to flow from the first chamber through the fluid flow passages into the second chamber.

In some embodiments, the insert body may include a divider wall. The divider wall may extend radially outward relative to the central axis from the insert body between the inner tube and the insert body to form the first chamber and a third chamber in fluid communication with the fluid flow passages to allow air to flow from the second chamber through the fluid flow passages into the third chamber.

According to another aspect of the present disclosure, a wave rotor may include a rotor drum assembly arranged to rotate about a central axis of the wave rotor. The rotor drum assembly may include an outer tube that extends along the central axis, an inner tube positioned radially between the outer tube and the central axis, and a plurality of webs extending radially between and interconnecting the outer and inner tubes to form a plurality of rotor passages. Each web may be formed to include a plurality of fluid flow passages extending through the web and adapted to receive conditioned air to regulate a temperature distribution of the rotor drum assembly.

In some embodiments, each web may include a radial outer surface and a radial inner surface located radially between the radial outer surface and the central axis. The radial inner surface may include a plurality of web inlet apertures opening into the fluid flow passages. The radial outer surface may include a plurality of web outlet apertures opening into the fluid flow passages.

In some embodiments, the rotor drum assembly may include a forward end and an aft end spaced apart axially from the forward end along the central axis. Each web may further include an aft sidewall extending between and interconnecting the radial outer and radial inner surfaces at the aft end. Each web is may be formed to include an exhaust passage extending between the radial inner surface and the aft sidewall.

In some embodiments, the outer tube is may be formed to include a plurality of outer openings that extend through the outer tube radially. The outer openings may be spaced apart axially relative to the central axis. Each outer opening may be aligned with and opens into a fluid flow passage.

In some embodiments, the inner tube may be formed to include a plurality of inner openings that extend through the inner tube radially. The inner openings may be spaced apart axially relative to the central axis. Each inner opening may be aligned with and open into a fluid flow passage.

In some embodiments, the rotor drum assembly may include an insert body extending along the central axis and may be positioned radially between the inner tube and the central axis. The insert body and the inner tube may cooperate to form a first chamber in fluid communication with the fluid flow passages.

In some embodiments, the insert body may include a divider wall. The divider wall may extend radially outward relative to the central axis from the insert body between the inner tube and the insert body to form the first chamber and a third chamber in fluid communication with the fluid flow passages to allow air to flow radially inward relative to the central axis through the fluid flow passages into the third chamber.

In some embodiments, the rotor drum assembly may include a drum sleeve extending along the central axis to position the outer tube between the drum sleeve and the inner tube. The drum sleeve and the outer tube may cooperate to form a second chamber in fluid communication with the fluid flow passages to allow air to flow radially outward relative to the central axis through the fluid flow passages into the second chamber.

According to another aspect of the present disclosure a method of regulating a temperature distribution of a wave rotor combustor may comprise a number of steps. The method may include providing a rotor drum assembly arranged to rotate about a central axis of the wave rotor combustor, the rotor drum assembly including a forward end, an aft end spaced apart from the forward end along the central axis, an outer tube that extends along the central axis between the forward and aft ends, an inner tube positioned radially between the outer tube and the central axis, and a plurality of webs extending radially between and interconnecting the outer and inner tubes to form a plurality of rotor passages, each web formed to include a plurality of fluid flow passages extending through the web and adapted to receive conditioned air and supplying conditioned air to the plurality of fluid flow passages near the aft end of the rotor drum assembly.

In some embodiments, the method may further include collecting the conditioned air exiting the fluid flow passages near the aft end of the rotor drum assembly and supplying the collected conditioned air to the plurality of fluid flow passages near the forward end of the rotor drum assembly.

According to another aspect of the present disclosure, a wave rotor combustor may include a drive shaft, a rotor drum assembly, and a plurality of hollow pins. The drive may be arranged to rotate about a central axis of the wave rotor. The rotor drum assembly may be formed to include a plurality of rotor passages extending axially through the rotor drum assembly. The plurality of hollow pins may be coupled to the drive shaft and the rotor drum assembly to center and drive the rotor drum assembly. The hollow pins may be adapted provides passages into and out of the rotor drum assembly for conditioned air to flow through the rotor drum assembly and regulate a temperature distribution of the rotor drum assembly.

In some embodiments, the rotor drum assembly may further include a plurality of webs extending radially about the central axis and positioned to define the rotor passages. Each web may be formed to include a plurality of fluid flow passages extending through the web and adapted to receive the conditioned air flowing through the hollow pins to regulate the temperature distribution of the rotor drum assembly.

In some embodiments, the rotor drum assembly may be formed to include a first annular chamber in communication with the fluid flow passages and located radially inwardly of the webs and a second annular chamber in communication with the fluid flow passages and located radially outwardly of the webs. The conditioned air may be arranged to flow through the hollow pins into the annular first chamber, through the fluid flow passages, and into the annular second chamber.

In some embodiments, the wave rotor combustor may further include an outlet plate formed to include an outlet port and an exhaust duct coupled with the outlet port. The wave rotor combustor may be formed to define a compartment arranged around the exhaust duct and adapted to receive high-pressure cooling air to cool the exhaust duct and block fluid located within the exhaust duct from escaping out of the exhaust duct.

These and other features of the present disclosure will become more apparent from the following description of the illustrative embodiments.

BRIEF DESCRIPTION OF THE DRAWINGS

FIG. 3A is a detail and partial cutaway view of the web shown in FIG. 3 showing that each web includes the fluid flow passages extending through the webs and that the fluid flow passages are not in fluid communication with the rotor passages;

DETAILED DESCRIPTION OF THE DRAWINGS

Figure 1:
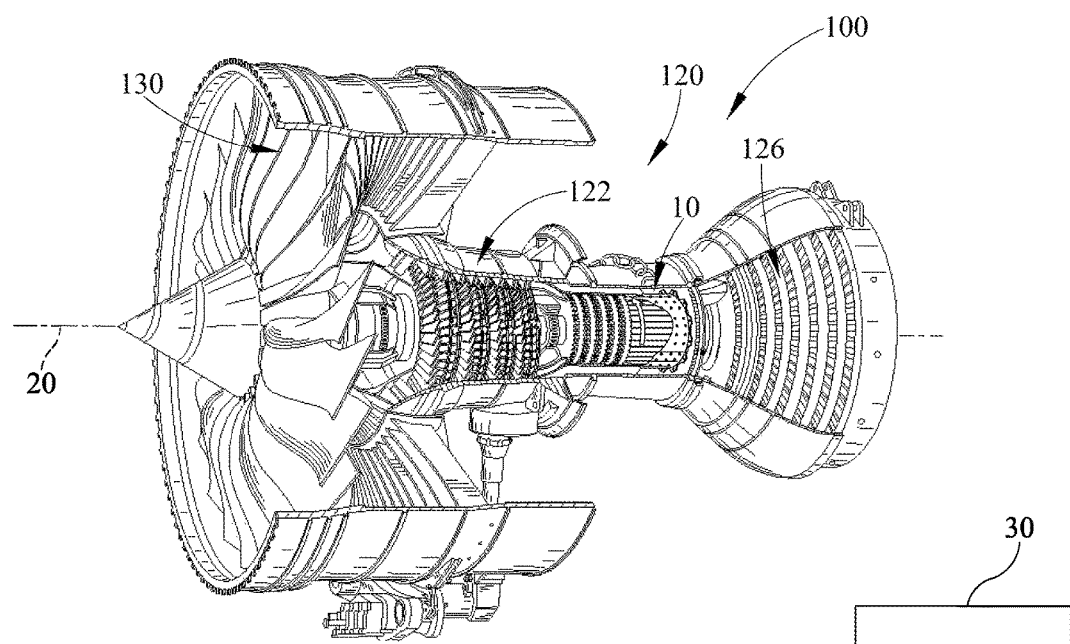
FIG. 1 is a cutaway view of a gas turbine engine including a wave rotor combustor arranged to continuously receive and ignite a mixture of fuel and air to produce hot high-pressure products that are directed into a turbine to drive the engine.

For the purposes of promoting an understanding of the principles of the disclosure, reference will now be made to a number of illustrative embodiments illustrated in the drawings and specific language will be used to describe the same.

An illustrative aerospace gas turbine engine 100 includes a wave rotor combustor 10 as part of an engine core 120 that powers a fan assembly 130 as shown in FIG. 1. The wave rotor combustor 10 is adapted to burn a fueled air 354 as part of a combustion process 300 to power the engine 100. The illustrative wave rotor combustor 10 is adapted to receive conditioned air 30 to regulate a temperature distribution of the wave rotor combustor 10 as suggested in FIG. 2. The wave rotor combustor 10 is an illustrative use of a wave rotor. In other embodiments, the disclosed features may be included in wave rotors used as pressure exchangers, flow dividers, flow combiners, etc.

Figure 2:
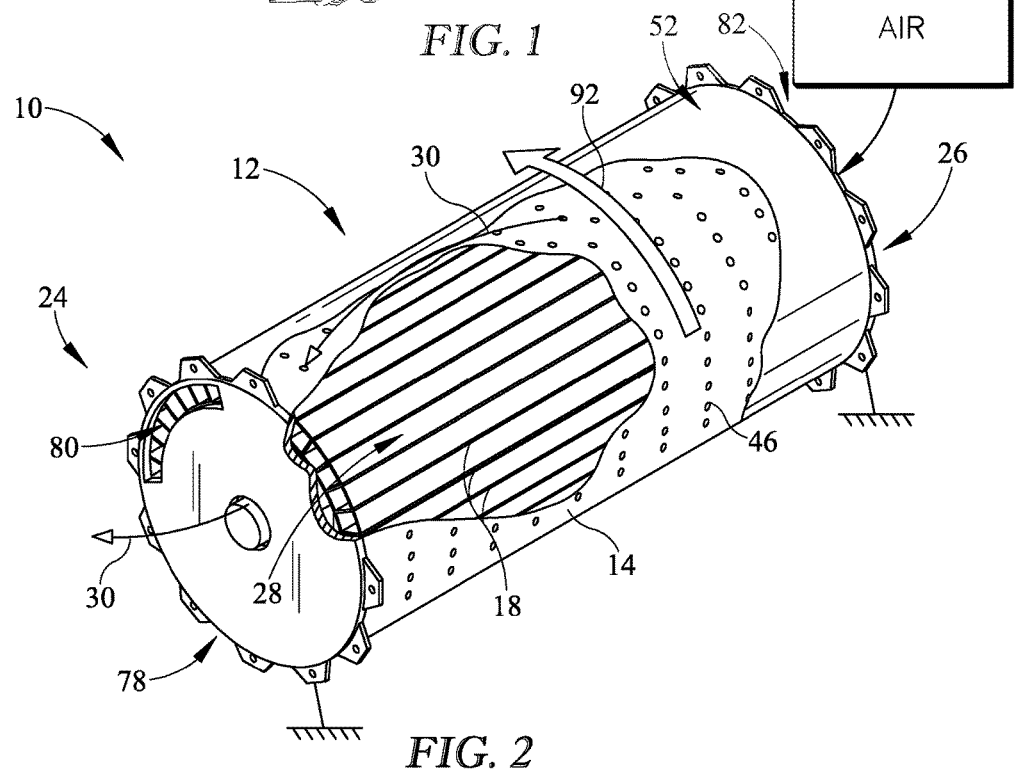
FIG. 2 is a cutaway view of the wave rotor combustor included in the gas turbine engine of FIG. 1 showing that the wave rotor combustor includes, from left to right, an inlet plate, a rotor drum assembly including a plurality of webs that cooperate to form rotor passages, and an outlet plate and suggesting that the wave rotor combustor is adapted to direct conditioned air through the webs to regulate a temperature of the wave rotor combustor.
Figure 3:
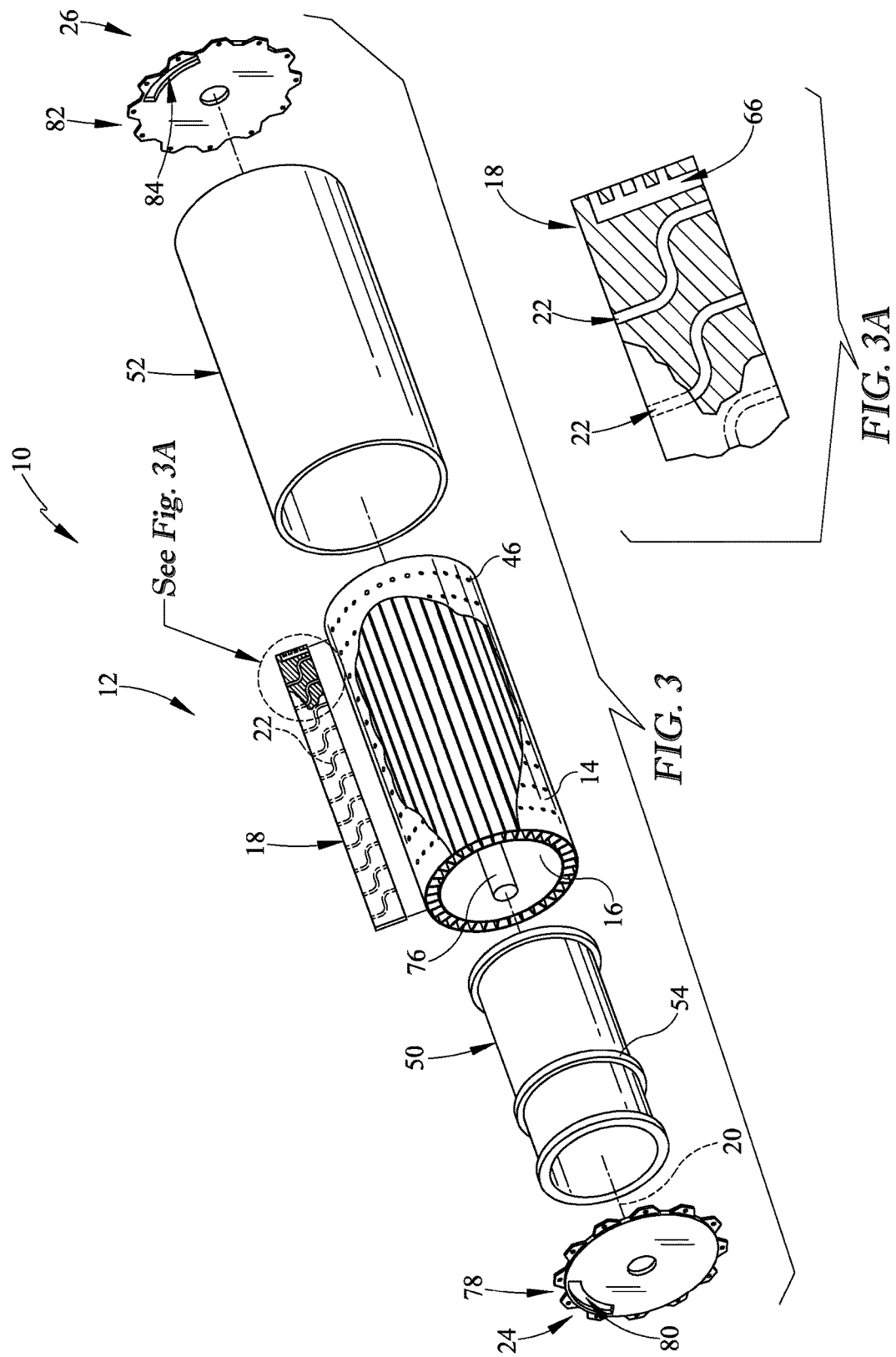
FIG. 3 is an exploded view of the wave rotor combustor showing that the wave rotor combustor includes, from left to right, the inlet plate, the rotor drum assembly, and the outlet plate and showing one web removed from the rotor drum to illustrate that the webs of the rotor drum include fluid flow passages that extend within and through the webs.

The wave rotor combustor 10 illustratively includes a rotor drum assembly 12, an inlet plate 78, and an outlet plate 82 as shown in FIGS. 2 and 3. The flow of fueled air 354 enters the rotor drum assembly 12 through an inlet port 80 formed in the inlet plate 78. The rotor drum assembly 12 ignites the fueled air 354 to power the engine core 120. In the illustrative embodiment, an igniter 396 ignites the fueled air 354. In other embodiments, the fueled air 354 may auto-ignite. The outlet plate 82 is formed to include an outlet port 84 arranged to expel the combusted gasses that result from the combustion process inside the rotor drum assembly 12.

The rotor drum assembly 12 is mounted for rotation about a central axis 20 of the engine 100 as suggested in FIGS. 1-3. The rotor drum assembly 12 is formed to include a plurality of rotor passages 28 spaced apart from the central axis 20 that extend along the central axis 20 as shown in FIG. 2. The rotor drum assembly 12 includes a forward end 24 and an aft end 26 and the rotor passages 28 extend between the forward and aft ends 24, 26. In the illustrative embodiment, the rotor passages 28 rotate about the central axis 20 in a counter-clockwise direction as indicated by arrow 92 in FIG. 2.

As each rotor passage 28 aligns with the inlet port 80, the fueled air 354 flows through the inlet port 80 into the rotor passage 28. After the rotor passage 28 rotates beyond the inlet port 80, the fueled air 354 is ignited and the resulting combusted gasses are blocked between the inlet and outlet plates 78, 82. As the rotor passage 28 aligns with the outlet port 84, the combusted gasses are expelled from the rotor passages 28 through the outlet plate 82 into the turbine 126. The turbine 126 extracts work from the combusted gasses 352 to power the engine 100. The rotor passage 28 continues to rotate about the central axis 20 and again aligns with the inlet port 80 and the combustion process 300 is reinitiated.

The combusted gasses 352 exiting the aft end 26 of the wave rotor combustor 10 have a relatively high-temperature. As the combusted gasses 352 pass through the wave rotor combustor 10, heat from the combusted gasses 352 is transferred into the wave rotor combustor 10 and causes the aft end 26 of the wave rotor combustor 10 to have a relatively high-temperature. The relatively high-temperatures may damage the wave rotor combustor 10 over time and may cause the components to have a relatively short life.

The fueled air 354 entering the forward end 24 of the wave rotor combustor 10 has a relatively low-temperature. As the fueled air 354 passes through the wave rotor combustor 10, heat from the wave rotor combustor 10 is transferred into the fueled air 354 and causes the forward end 24 of the wave rotor combustor 10 to have a relatively low-temperature.

As a result, a non-uniform temperature distribution transitions from the low-temperature forward end 24 to the high-temperature aft end 26 of the wave rotor combustor 10. The non-uniform temperature distribution may damage the wave rotor combustor 10 over time due to stresses caused by non-uniform growth, for example. Non-uniform growth of the wave rotor combustor 10 may reduce the effectiveness of seals included in the wave rotor combustor 10 and cause the wave rotor combustor 10 to be less efficient.

The illustrative rotor drum assembly 12 is adapted to receive a fluid to regulate the temperature distribution of the wave rotor combustor 10. In the illustrative embodiment, the fluid is conditioned air 30. The temperature distribution of the wave rotor combustor 10 may be regulated with the conditioned air 30 to cause the wave rotor combustor 10 to have a more uniform temperature distribution and/or lower the overall temperatures experienced by the wave rotor combustor 10. In the illustrative embodiment, the conditioned air 30 is high-pressure air from the compressor 122. In other embodiments, the fluid may comprise conditioned air 30 and other fluid(s). In other embodiments, the fluid may not comprise air.

The rotor drum assembly 12 includes an outer tube 14 that extends along the central axis 20, an inner tube 16 positioned radially between the outer tube 14 and the central axis 20, and a plurality of webs 18 extending radially between and interconnecting the outer and inner tubes 14, 16 to form the plurality of rotor passages 28 as shown in FIG. 3. In the illustrative embodiment, each web 18 is formed to include a plurality of fluid flow passages 22 (sometimes called heat-exchanging passages) extending through the web 18 as shown in FIGS. 3A and 4.

The fluid flow passages 22 are adapted to receive the flow of conditioned air 30 to transfer heat between the conditioned air 30 and the rotor drum assembly 12 to regulate the temperature distribution of the rotor drum assembly 12. As shown in FIGS. 3 and 3A, the conditioned air 30 is arranged to enter and exit through the webs 18 without flowing into the rotor passages 28. As such, heat is transferred between the conditioned air 30 and the wave rotor combustor 10 without mixing the conditioned air 30 and the fluids located in the rotor passages 28. In other words, the webs 18 block direct communication between the rotor passages 28 and the fluid flow passages 22 in the illustrative embodiment.

Figure 4:
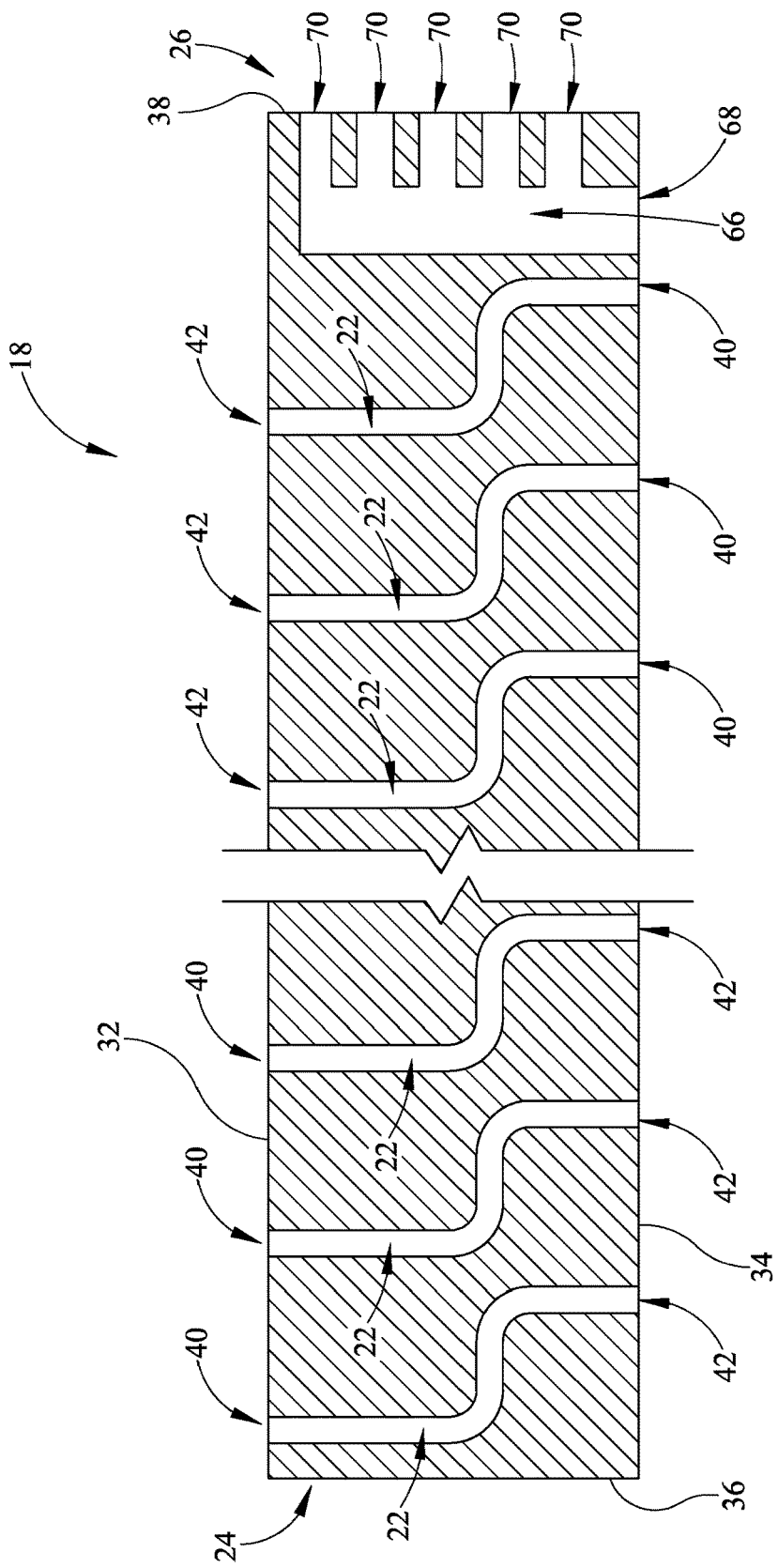
FIG. 4 is a sectional view of a web included in the rotor drum assembly showing that each web includes the fluid flow passages extending radially through the web and the fluid flow passages are arranged to receive conditioned air to regulate the temperature of the rotor drum assembly.

Each web 18 includes a radial outer surface 32, a radial inner surface 34 radially spaced apart from the radial outer surface 32, a forward sidewall 36 extending between the radial outer surface 32 and the radial inner surface 34 near the forward end 24, and an aft sidewall 38 extending between the radial outer surface 32 and the radial inner surface 34 at the aft end 26 as shown in FIG. 4. The fluid flow passages 22 extend through and within the web 18 between the radial inner surface 34 and the radial outer surface 32. In the illustrative embodiment, the fluid flow passages 22 are curved as shown in FIGS. 3A and 4. In some embodiments, the fluid flow passages 22 form a serpentine shape or rotated S-shape. In other embodiments, the fluid flow passages 22 may be linear or nonlinear.

The radial inner surface 34 is formed to include a plurality of inlet apertures 40 near the aft end 26 of the rotor drum assembly 12 as shown in FIG. 4. The radial outer surface 32 is formed to include a plurality of outlet apertures 42 near the aft end 26 of the rotor drum assembly 12. Each inlet aperture 40 opens into a fluid flow passage 22 located near the aft end 26 and each outlet aperture 42 opens into a corresponding fluid flow passage 22 to provide openings into and out of the fluid flow passage 22 respectively.

The radial outer surface 32 is formed to include a plurality of inlet apertures 40 near the forward end 24 of the rotor drum assembly 12 as shown in FIG. 4. The radial inner surface 34 is formed to include a plurality of outlet apertures 42 near the forward end 24 of the rotor drum assembly 12. Each inlet aperture 40 opens into a fluid flow passage 22 located near the forward end 24 and each outlet aperture 42 opens into a corresponding fluid flow passage 22 to provide openings into and out of the fluid flow passages 22 respectively.

The inner tube 16 is formed to include a plurality of inner openings 44 that extend radially through the inner tube 16 as suggested in FIGS. 3 and 5-7. The inner openings 44 are spaced apart axially relative to the central axis 20. Each inner opening 44 is aligned with and opens into one of an inlet aperture 40 or an outlet aperture 42 formed in the radial inner surface 34 of a web 18.

The outer tube 14 is formed to include a plurality of outer openings 46 that extend radially through the outer tube 14 as suggested in FIGS. 3 and 5-7. The outer openings 46 are spaced apart axially relative to the central axis 20. Each outer opening 46 is aligned with and opens into one of an inlet aperture 40 or an outlet aperture 42 formed in the radial outer surface 32 of a web 18.

Figure 5:
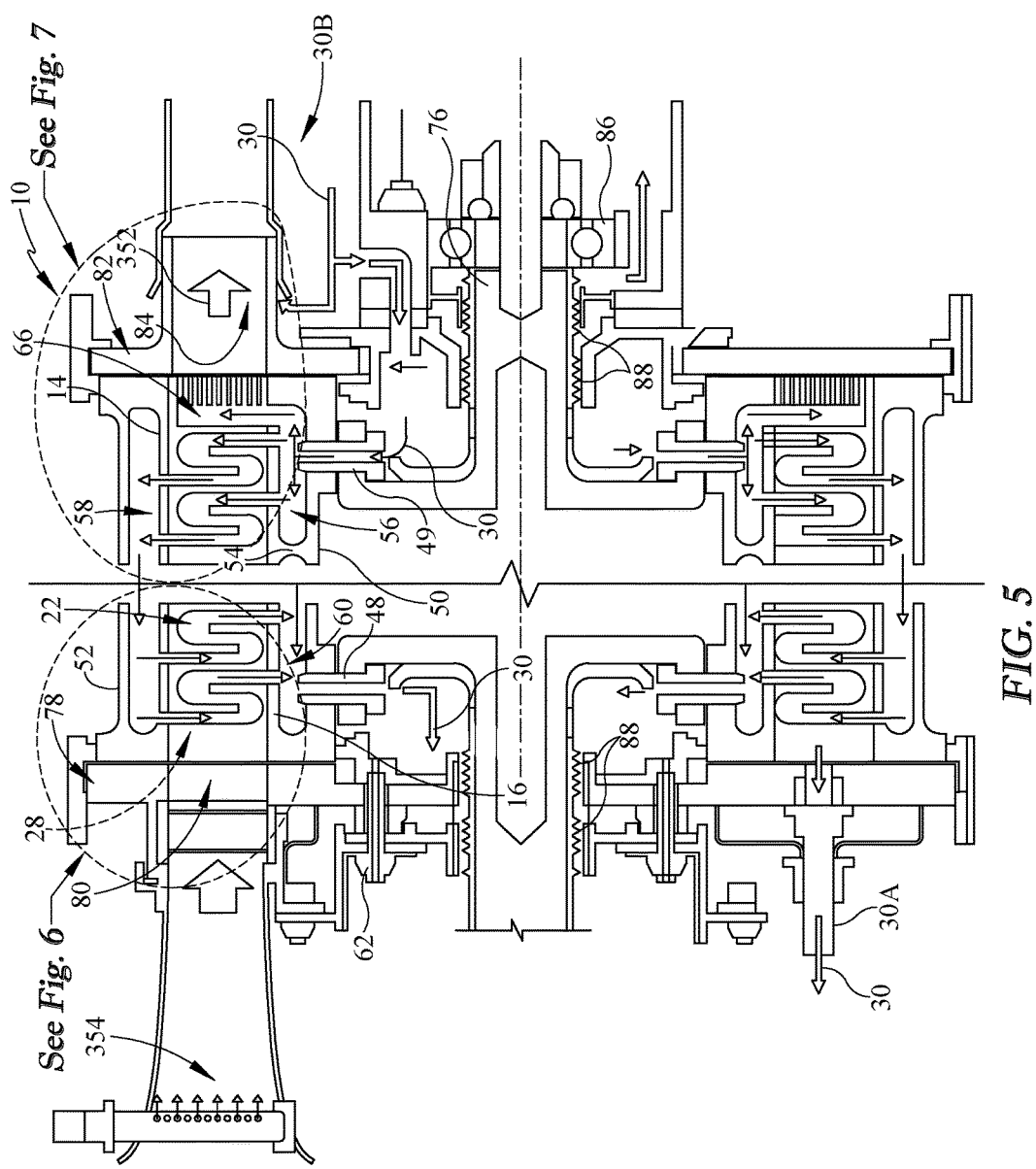
FIG. 5 is a diagrammatic and sectional view of the wave rotor combustor showing that the rotor drum assembly includes an outer tube, an inner tube spaced apart radially from the outer tube, and the plurality of webs extend between the outer and inner tubes to form the rotor passages and each web is formed to include the fluid flow passages adapted to receive the conditioned air.
Figure 7:
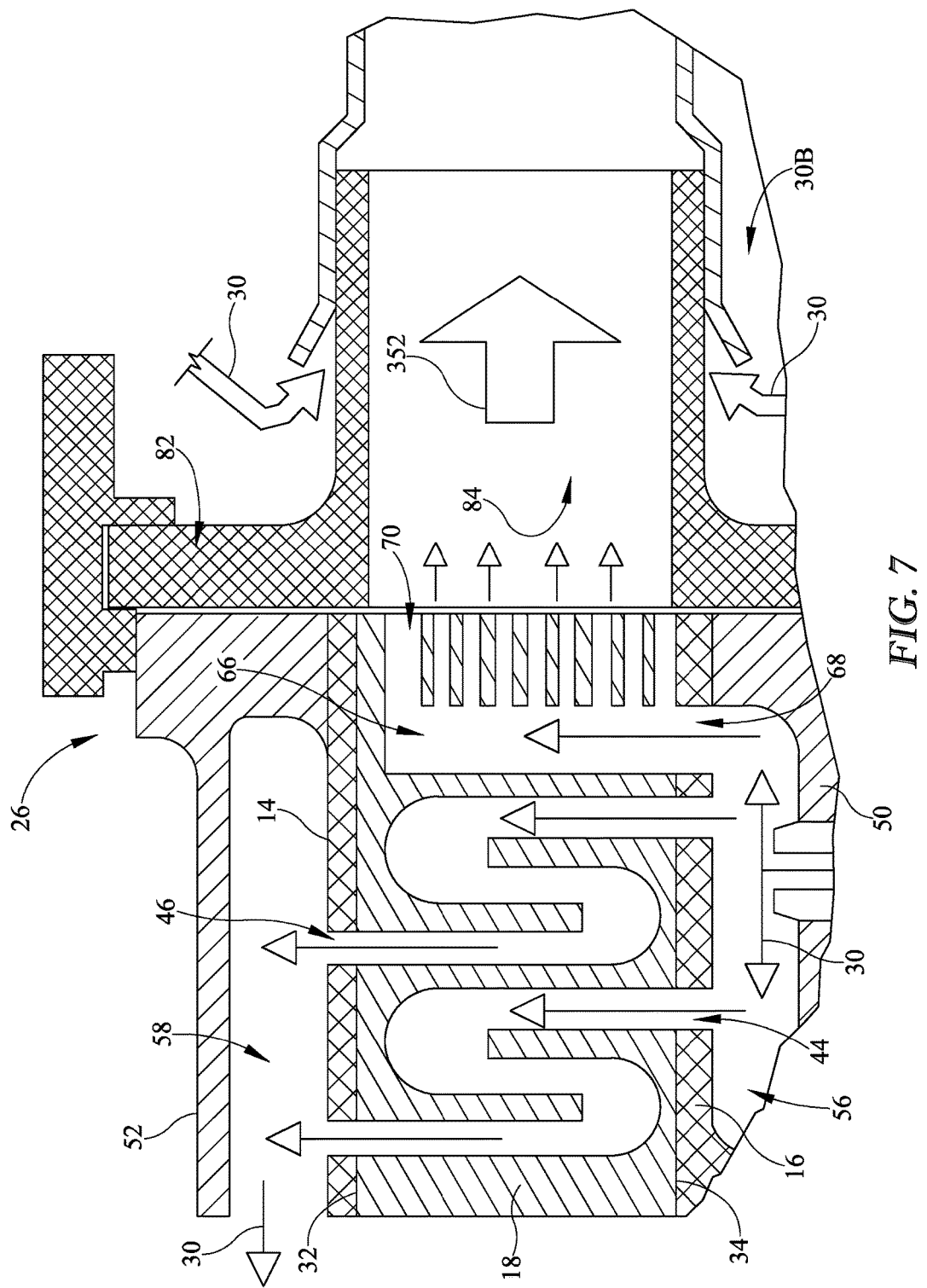
FIG. 7 is a detail view of a portion of FIG. 5 at an aft end of the wave rotor combustor showing that high-temperature combusted gasses exit the rotor passages at the aft end of the wave rotor combustor and low-temperature conditioned air is passed through the fluid flow passages near the aft end to cool the aft end of the wave rotor combustor.

Illustratively, low-temperature conditioned air 30 is directed into the fluid flow passages 22 near the aft end 26 of the rotor drum assembly 12 to cool the high-temperature aft end 26 of the rotor drum assembly 12 as shown in FIGS. 5 and 7. The low-temperature conditioned air 30 flows through inner openings 44 formed in the inner tube 16 near the aft end 26. The low-temperature conditioned air 30 flows through the inlet apertures 40 aligned with the inner openings 44 into the fluid flow passages 22. As the conditioned air 30 flows through the fluid flow passages 22, heat is transferred from the high-temperature aft end 26 portions of the webs 18 into the low-temperature conditioned air 30 to form high-temperature conditioned air 30. The heated high-temperature conditioned air 30 exits the fluid flow passages 22 through the outlet apertures 42 and then through the outer openings 46 to expel the heated high-temperature conditioned air 30.

Figure 6:
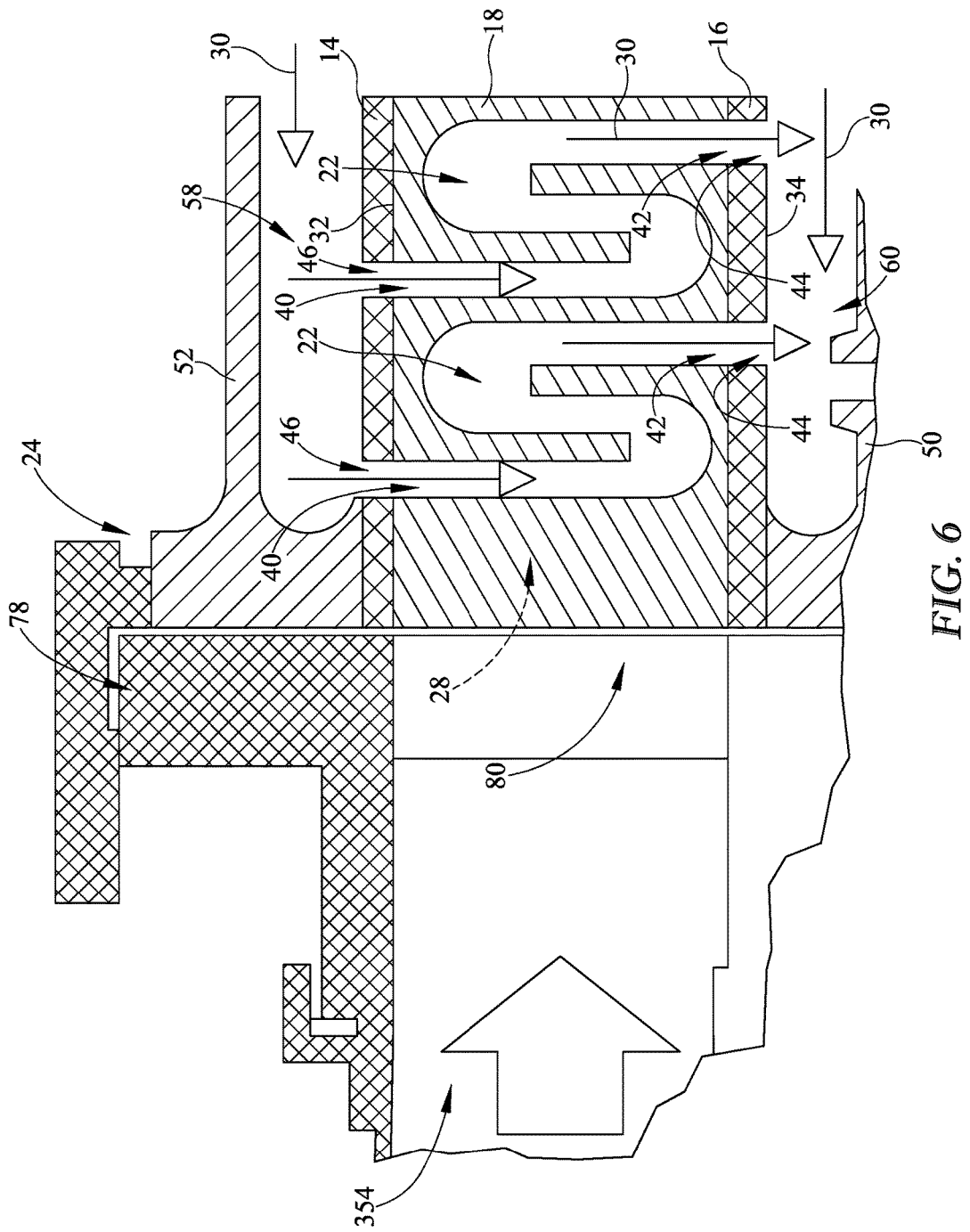
FIG. 6 is a detail view of a portion of FIG. 5 at a forward end of the wave rotor combustor showing that a low-temperature fuel-air mixture is received in the rotor passages at the forward end of the wave rotor combustor and high-temperature conditioned air is passed through the fluid flow passages near the forward end to heat the forward end of the wave rotor combustor.

In the illustrative embodiment, the heated high-temperature conditioned air 30 is redirected through the fluid flow passages 22 near the forward end 24 of the rotor drum assembly 12 to heat the low-temperature forward end 24 portion of the webs 18 as shown in FIGS. 5 and 6. The high-temperature conditioned air 30 flows through the outer openings 46 formed in the outer tube 14 near the forward end 24. The high-temperature conditioned air 30 flows through the inlet apertures 40 aligned with the outer openings 46 into the fluid flow passages 22. As the conditioned air 30 flows through the fluid flow passages 22, heat is transferred from the high-temperature conditioned air 30 into the aft end 26. The conditioned air 30 exits the fluid flow passages 22 through the outlet apertures 42 and then through the inner openings 44 to expel the conditioned air 30.

In other embodiments, a first source of low-temperature conditioned air 30 is directed radially outward through the fluid flow passages 22 near the aft end 26 to cool the rotor drum assembly 12. A second source of high-temperature conditioned air 30 is directed radially outward through the fluid flow passages 22 near the forward end 24 to heat the rotor drum assembly 12. The low-temperature conditioned air 30 and the high-temperature conditioned air 30 are then expelled through the outer tube 14 of the rotor drum assembly 12.

In other embodiments, a first source of low-temperature conditioned air 30 is directed radially inward through the fluid flow passages 22 near the aft end 26 to cool the rotor drum assembly 12. A second source of high-temperature conditioned air 30 is directed radially inward through the fluid flow passages 22 near the forward end 24 to heat the rotor drum assembly 12. The low-temperature conditioned air 30 and the high-temperature conditioned air 30 are expelled through the inner tube 16 of the rotor drum assembly 12.

In yet other embodiments, high-temperate conditioned air 30 is directed radially outward through the fluid flow passages 22 near the forward end 24 to heat the rotor drum assembly 12. The cooled low-temperature conditioned air 30 is redirected radially inward through the fluid flow passages 22 near the aft end 26 to cool the rotor drum assembly 12. The conditioned air 30 is then expelled through the inner tube 16 of the rotor drum assembly 12.

Each web 18 further includes an exhaust passage 66 as shown in FIGS. 3A, 4, and 7. The exhaust passages 66 extend between the radial inner surface 34 and the aft sidewall 38. The radial inner surface 34 is formed to include an exhaust inlet aperture 68 opening into the exhaust passage 66. The aft sidewall 38 is formed to include a plurality of exhaust outlet apertures 70 opening into the exhaust passage 66. The low-temperature conditioned air 30 is received in the exhaust inlet aperture 68 and exits the exhaust passage 66 through the plurality of exhaust outlet apertures 70. As such, a portion of the coolest low-temperature conditioned air 30 flows through the exhaust passages 66 to transfer heat away from the hottest portion of the high-temperature aft end 26.

As shown in FIG. 5, conditioned air 30 is supplied from a conduit 30A that is in fluid communication with a high-pressure air source. In the illustrative embodiment, the high-pressure air is supplied by the wave rotor combustor 10. In other embodiments, the high-pressure air is supplied from an external source such as, for example, the compressor 122.

The conditioned air 30 flows through the conduit 30A and is directed into a compartment 30B that surrounds the outlet port 84. In some embodiments, the conditioned air 30 in the compartment 30B cools the outlet port 84 and an exhaust duct coupled with the outlet port 84. In some embodiments, the low-temperature conditioned air 30 in the compartment 30B has a higher pressure than the high-temperature fluids in outlet port 84 and exhaust duct. As such, if there are any breaches between the outlet port 84 and the exhaust duct, the conditioned air 30 is directed into the outlet port 84 and exhaust duct and blocks the high-temperature fluids from escaping the outlet port 84 and exhaust duct instead of the high-temperature fluids in the outlet port 84 and exhaust duct being directed out of the outlet port 84 and into the compartment 30B.

The illustrative rotor drum assembly 12 further includes an insert body 50 and a drum sleeve 52 as shown in FIG. 3. The insert body 50 directs low-temperature conditioned air 30 into the fluid flow passages 22 near the aft end 26 and blocks the low-temperature conditioned air 30 from entering the fluid flow passages 22 near the forward end 24 as shown in FIG. 5. The drum sleeve 52 directs the heated high-temperature conditioned air 30 into the fluid flow passages 22 near the forward end 24.

The insert body 50 extends along the central axis 20 and is positioned radially between the inner tube 16 and the central axis 20 as shown in FIGS. 3 and 5-7. The insert body 50 and the inner tube 16 cooperate to form a first chamber 56 and a third chamber 60 that are in fluid communication with the fluid flow passages 22. In the illustrative embodiment, the first chamber 56 and the third chamber 60 are annular. The insert body further includes a divider wall 54 that extends radially from the insert body 50 between the inner tube 16 and the insert body 50 to form the first chamber 56 and the third chamber 60.

The drum sleeve 52 extends along the central axis 20 and positions the outer tube 14 between the drum sleeve 52 and the inner tube 16 as shown in FIGS. 3 and 5-7. The drum sleeve 52 and the outer tube 14 cooperate to form a second chamber 58 that is in fluid communication with the fluid flow passages 22. In the illustrative embodiment, the second chamber 58 is annular.

The temperature regulating process of the wave rotor combustor 10 is shown in FIGS. 5-7. The conditioned air 30 is provided by the conduit 30A and directed to compartment 30B. Illustratively, the conditioned air 30 is forced through the rotor drum assembly 12 using a positive pressure drop. The forward end 24 and the aft end 26 of the wave rotor combustor 10 are depicted with a break between the wave rotor combustor 10 to permit more detail of the forward and aft ends 24, 26. The webs 18 are depicted in a sectional view to reveal the fluid flow passages 22 and the exhaust passage 66 formed in the webs 18. As such, the rotor passages 28 are obscured by the webs 18 as shown in FIG. 5.

The rotor passages 28 formed by the webs 18 extend along the central axis 20 behind and in front of the webs 18 and the combustion process 300 occurs in the rotor passages 28. The fueled air 354 enters the rotor passages 28 at the forward end 24 of the wave rotor combustor 10 as shown in FIG. 5. The fueled air 354 is combusted within the rotor passages 28 and is expelled through the outlet plate 82 at the aft end 26 of the wave rotor combustor 10. Illustratively, the conditioned air 30 is not in fluid communication with the rotor passages 28 and flows through the webs 18 without mixing with the fluids in the rotor passages 28.

In operation, the low-temperature conditioned air 30 is passed into the annular first chamber 56 through hollow drive pins 48, 49 used to center and drive the rotor drum assembly 12 as shown in FIGS. 5 and 7. The hollow drive pins 48, 49 may provide thermal isolation between the components of the wave rotor combustor 10. The conditioned air 30 passes through the inner tube 16, the fluid flow passages 22, and the outer tube 14. Heat from the rotor drum assembly 12 is transferred into the conditioned air 30 to cool the aft end 26 of the rotor drum assembly 12 and heat the conditioned air 30. The heated high-temperature conditioned air 30 flows out of the fluid flow passages 22 into the annular second chamber 58 near the aft end 26.

The heated high-temperature conditioned air 30 flows toward the forward end 24 and passes through the outer tube 14, the fluid flow passages 22, and the inner tube 16 as shown in FIGS. 5 and 6. Heat is transferred from the high-temperature conditioned air 30 into the low-temperature forward end 24 of the rotor drum assembly 12 to heat the forward end 24. The conditioned air 30 flows out of the fluid flow passages 22 and into the annular third chamber 60. The conditioned air 30 is expelled out of the annular third chamber 60 and out of the wave rotor combustor 10 through a passage formed in a fastener 62 in the illustrative embodiment.

The illustrative design allows the use of internal fins, pins, or turbulence enhancing projections to tailor the cooling to match local head load and to minimize thermal gradients within the structure. The fluid flow passages 22 may be single pass, two pass, or another arrangement to achieve a desired temperature distribution. In some embodiments, the rotor drum assembly 12 may be an integral (one-piece) casting. In some embodiments, the rotor drum assembly 12 may be an integral additive manufactured part. In other embodiments, the rotor drum assembly 12 may be a fabricated assembly of parts including the use of replaceable webs 18. In some embodiments, the webs 18 include dovetail attachments or other suitable means to fasten the webs 18 to the outer and inner tubes 14, 16.

Figure 8:
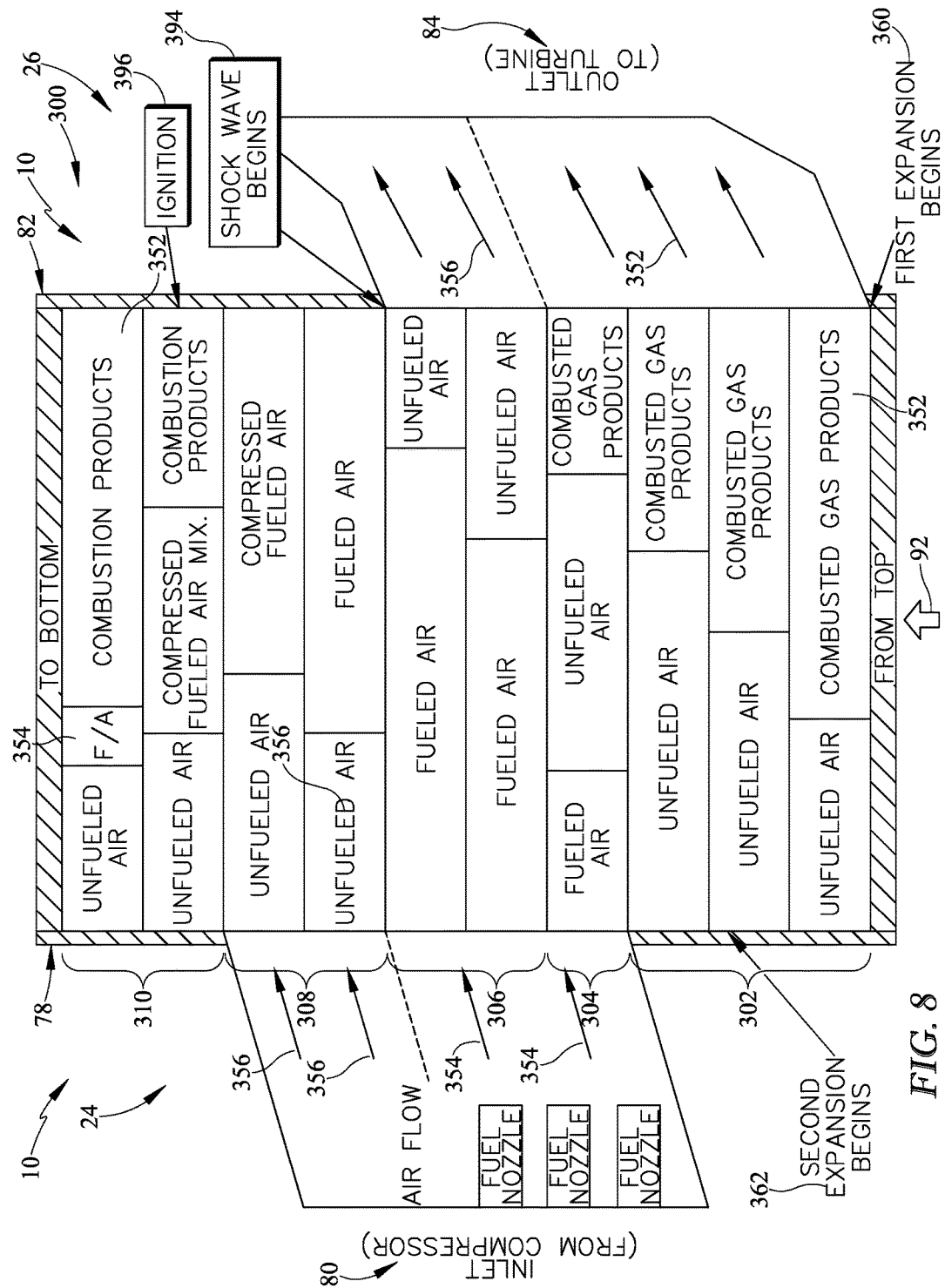
FIG. 8 is a diagrammatic view of a cycle of the combustion process that occurs within each rotor passage of the wave rotor combustor and the cycle depicts a single rotor passage at discrete circumferential positions as it completes a revolution about the central axis.
Figure 9:
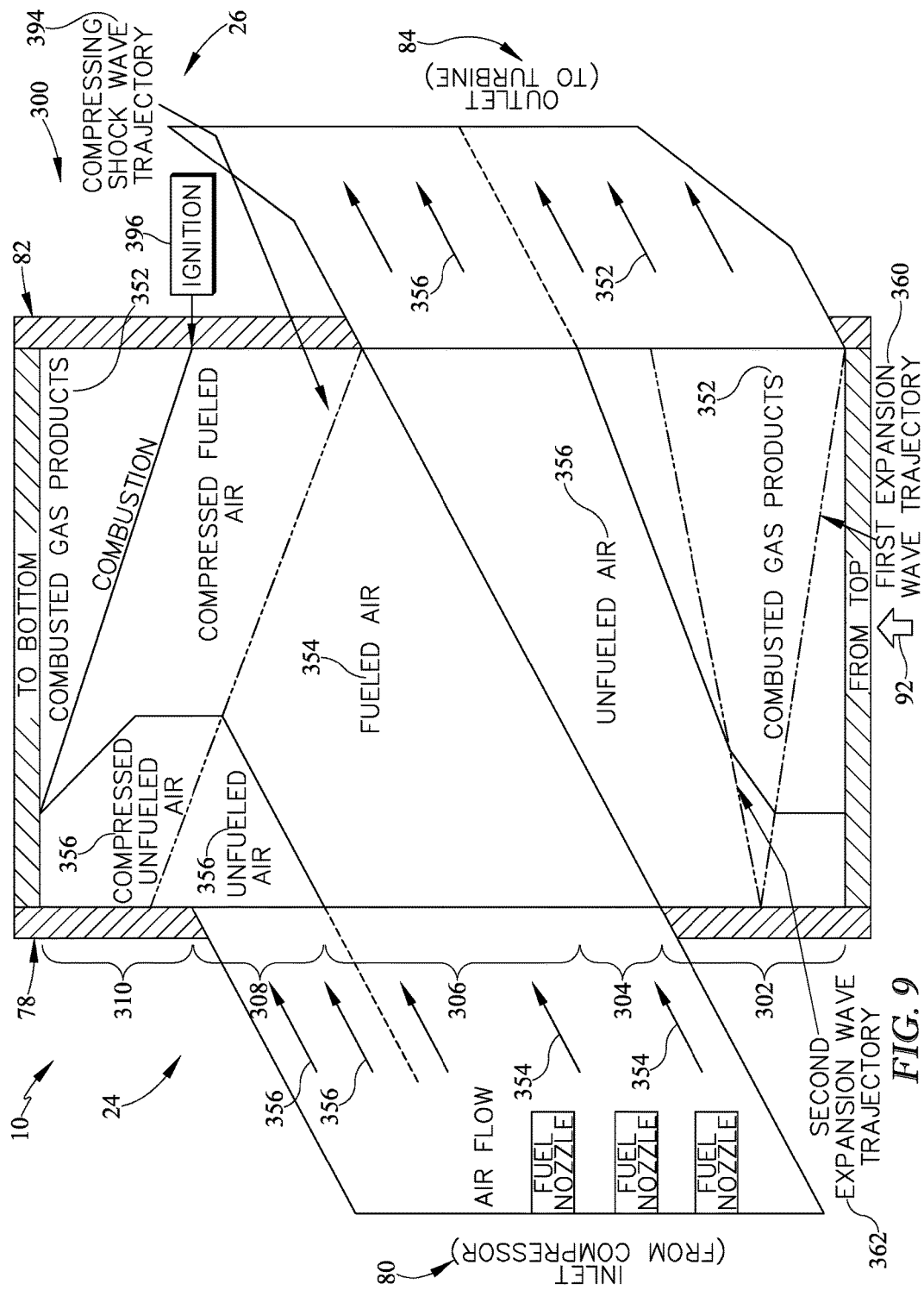
FIG. 9 is another diagrammatic view of a cycle of the combustion process that occurs within each rotor passage of the wave rotor combustor and the cycle depicts a single rotor passage at continuous circumferential positions as it completes a revolution about the central axis.

The wave rotor combustor 10 receives and combusts the fueled air 354 in the combustion process 300 as shown in FIGS. 8 and 9. The wave rotor combustor 10 is configured to use transient internal fluid flow to compress fuel and air prior to combustion to improve the efficiency of combustion within the wave rotor combustor 10.

The wave rotor combustor 10 includes the inlet plate 78, the rotor drum assembly 12, and the outlet plate 82 as shown in FIGS. 2 and 3. The inlet plate 78 is coupled to the engine core 120 and is formed to include the inlet port 80 that extends circumferentially along an arc about the central axis 20 of the wave rotor combustor 10. The outlet plate 82 is formed to include the outlet port 84 that extends circumferentially along an arc about the central axis 20 of the wave rotor combustor 10. The rotor drum assembly 12 is mounted for rotation relative to the inlet plate 78 and the outlet plate 82 about the central axis 20.

Illustratively, the inlet and outlet plates 78, 82 are spaced apart from the rotor drum assembly 12 to form a clearance gap between the rotor drum assembly 12 and each plate 78, 82 to control the passage of flow into and out of the rotor passages 28. In some embodiments, the plates 78, 82 are arranged to seal the rotor drum assembly 12 to minimize leakage of flow out of the rotor passage 28.

In the illustrative embodiment, the inlet plate 78 includes a single inlet port 80 and the outlet plate 82 includes a single outlet port 84. In other embodiments, the inlet plate 78 is formed to include a plurality of inlet ports 80 and the outlet plate 82 is formed to include a plurality of outlet ports 84.

In the illustrative embodiment, the rotor passages 28 are generally parallel with the central axis 20 and the rotor drum assembly 12 is rotated by a drive shaft 76. In other embodiments, the rotor passages 28 extend axially along and circumferentially around the central axis 20. In some embodiments, the rotor passages 28 are arranged to cause the rotor drum assembly 12 to rotate as a result of the shape of the rotor passages 28 and the combustion process that occurs within the rotor passages 28.

An illustrative combustion process 300 occurs within the rotor passages 28 as the rotor passages 28 rotate about the central axis 20 as suggested in FIGS. 8 and 9. The combustion process 300 is substantially a constant volume combustion process.

The combustion process 300 occurs in each rotor passage 28 of the wave rotor combustor 10 as depicted in a space-time wave diagram shown in FIGS. 8 and 9. The wave diagram shown in FIG. 8 depicts the sequence of events occurring during one cycle within a rotor passage 28 at discrete circumferential positions. The arrow 92 indicates the direction of rotation of the rotor passage 28. Upon the rotation of the rotor drum assembly 12, each of the rotor passages 28 are sequentially brought into alignment with the inlet port 80 and the outlet port 84.

The combustion process 300 is depicted in another space-time wave diagram shown in FIG. 9. The wave diagram shown in FIG. 9 depicts the sequence of events occurring during one cycle within a rotor passage 28 in continuous circumferential positions. The arrow 92 indicates the direction of rotation of the rotor passage 28.

The combustion process 300 is periodic such that the top of each wave diagram loops around and join with itself at the bottom of the diagram. The wave diagrams, for the purpose of description, may be started at any point. However, for convenience, the description is started at step 302 corresponding to the bottom of the wave diagrams shown in FIGS. 8 and 9.

In step 302, the forward end 24 of the rotor passage 28 is blocked by the inlet plate 78. The aft end 26 of the rotor passage 28 is aligned with and opens into the outlet port 84 formed in the outlet plate 82. The rotor passage 28 contains unfueled air 356 and combusted gas products 352. The combusted gas products 352 are hot high-pressure products resulting from the combustion of the fueled air 354.

As the rotor passage 28 opens into the outlet port 84, the combusted gas products 352 expand and exit the rotor passage 28 through the relatively low-pressure outlet port 84. A first expansion wave 360 originates from the aft end 26 of the rotor passage 28 and propagates toward the forward end 24 expelling the combusted gas products 352 through the outlet port 84. The combusted gas products 352 exiting the outlet port 84 are relatively hot and relatively-high velocity combusted gasses.

As the rotor passage 28 continues to rotate, the first expansion wave 360 reaches the forward end 24 and forms a second expansion wave 362. The second expansion wave 362 propagates toward the aft end 26 expelling the combusted gas products 352 through the outlet port 84. As such, the combusted gas products 352 continue to expand and exit through the outlet port 84 and the unfueled air 356 expands toward the outlet port 84. The combusted gas products 352 exiting through the outlet port 84 after the second expansion wave 362 are relatively cooler and relatively-low velocity combusted gasses due to the expansion of the combusted gas products 352.

In a step 304, the rotor passage 28 aligns with and opens into the inlet port 80. The fueled air 354 is directed through the inlet port 80 into the rotor passage 28. The fueled air 354 has relatively greater pressure than the remaining unfueled air 356 and combusted gas products 352. As such, the fueled air 354 is drawn into the rotor passage 28 and the unfueled air 356 and combusted gas products 352 flow axially through the outlet port 84.

In the illustrative embodiment, the compressor 122 provides a flow of unfueled air 356 upstream of the inlet port 80. Illustratively, fuel nozzles continuously spray fuel into a portion of the flow of unfueled air 356 upstream of the inlet port 80. The fuel and air mix before entering the rotor passage 28 to form the fueled air 354. The fueled air 354 is separated from the combusted gas products 352 in the rotor passage 28 by the unfueled air 356. As such, the fueled air 354 is blocked from unintentional ignition. In the illustrative embodiment, air is used in the fueled air 354 and the unfueled air 356. In other embodiment, air may be omitted and replaced with a fueled oxidant 354 and an unfueled oxidant 356 respectively.

In a step 306, the fueled air 354 continues to be directed into the rotor passage 28 until the unfueled air 356 has been significantly expelled out of the rotor passage 28. The unfueled air 356 is relatively cooler than the combusted gas products 352.

The wave rotor combustor 10 is arranged such that, as the unfueled air 356 is significantly expelled out of the rotor passage 28, the rotor passage 28 rotates beyond the outlet port 84. As a result, the outlet plate 82 blocks the fueled air 354 from escaping through the aft end 26 of the rotor passage 28. When the aft end 26 of the rotor passage 28 is closed by the outlet plate 82, a shock wave 394 begins at the aft end 26 of the rotor passage 28 and propagates toward the forward end 24. The shock wave 394 causes the fueled air 354 to compress.

In a step 308, the flow of fueled air 354 ends and the flow of unfueled air 356 continues to enter the rotor passage 28 due to the pressure in the rotor passage 28 being lower than the pressure at the inlet 80. The compressing shock 394 compresses the fueled air 354 and the unfueled air 356.

In a step 310, the rotor passage 28 rotates beyond the inlet port 80 to block the flow of unfueled air 356 from entering the rotor passage 28. The fluid within the rotor passage 28 is blocked from escaping the rotor passage 28 by the inlet plate 78 at the forward end 24 and by the outlet plate 82 at the aft end 26. An ignition source 396 ignites the compressed fuel-air mixture 354 at the aft end 26 of the rotor passage 28. In other embodiments, the compressed fuel-air mixture 354 ignites as a result of auto-ignition.

As the fueled air 354 combusts, the fueled air 354 expands to form the combusted gas products 352. The portion of the unfueled air 356 that did not receive fuel added by the fuel nozzle, having entered during step 308, experiences no combustion and is compressed by shock wave 394. The combusted gas products 352 expand and further compress the unfueled air 356. The rotor passage 28 continues to rotate about the central axis 20 and returns to step 302 at the bottom of the wave diagram shown in FIGS. 8 and 9.

According to the illustrative embodiment, the wave rotor combustor further includes a shaft 72, bearings 86, and seals 88. The shaft 72 is supported on the bearings 86. An internal cavity of the rotor drum assembly 12 is sealed by the seals 88. In the illustrative embodiment, the seals 88 are knife seals 88.

According to the present disclosure, a wave rotor combustor 10 is adapted to burn a fueled air 354 as part of a combustion process 300 to power the engine 100 as shown in FIG. 5. Air flows from left to right with cooler combustor inlet air entering from the left, passing through the rotor passages 28 formed by the webs 18 located between the outer and inner tubes 14, 16 with hot gas exiting to the right.

Fuel mixed with the inlet air is combusted on board the rotor passages 28 as part of the combustion process 300. In an uncooled rotor 10, there is a rather marked temperature rise from left to right with the exit end of the rotor 10 over twice as hot as is the inlet end. In some embodiments, the air pressure is in a range of about 4 to 10 atmospheres and the exit temperatures are set by the capability of downstream turbomachinery, often including cooling to permit the high temperature operation. The wave rotor combustor 10 may be self-cooled in that the rotor inner tube 16 and webs 18 alternatively are exposed to the cool inlet air and the hot products of combustion. The webs 18 and the outer and inner tubes 14, 16 may need additional cooling. The present disclosure provides methods for achieving additional cooling.

High-pressure air is drawn from the rotor stationary end plate 78, as shown in FIG. 5, from a location where pressures exceed the exit pressure. The air is then supplied to the compartment 30B that surrounds the exit duct of the outlet port 84. This blocks leakage of the exiting hot gas from impinging on structural elements and ensures that the exit flow is directed to downstream components. This high-pressure air becomes the source available for rotor cooling. Using the positive pressure drop available, the cooling air 30 is provided through the stationary structure on the right end of the wave rotor combustor 10 to the drive plate at the right end of the rotor 10.

The air is then taken aboard the rotor 10 through hollow drive pins 48, 49 used to both center (locate) and drive (torque) the outer rotor assembly at the same time providing thermal isolation between the drive shafting and the rotor components. From the drive pins 48, 49, the cooling air 30 fills the series of longitudinal cylindrical chambers produced as an integral part of the inner tube 16. The chambers serve to feed the cooling air 30 into the series of cored fluid flow passages 22, thus, providing cooling to the surface of the hollow webs 18. The heated air is exhausted into a series of longitudinal cylindrical passages formed in the outer tube 14 and thus to similar cored fluid flow passages 22 in the hollow webs 18 near the left or cold end of the wave rotor combustor 10.

Illustratively, there is a blockage in the longitudinal cylindrical chambers (passages) in the inner tube 16 so that the high-pressure air supplied to the right or hot end of the wave rotor combustor 10 passes through the web connecting passages near the hot end of the wave rotor combustor 10 before it flows to the inner tube 16 by means of the similar passages through the web 18 near the cooler end of the wave rotor combustor 10. In some embodiments, the cooling passages are not present in the cooler inlet end of the webs 18.

The cooling air, which has been warmed and is, thus, "spent" in terms of pressure drop, is exhausted into the chamber to the left of the left hand drive plate through the hollow pins 48, 49. From this chamber, the air is exhausted to a suitable downstream location within the overall engine 100. Illustratively, the cool, high-pressure air comes on board the wave rotor combustor 10 near the hot end and a the exhaust passages 66 are provided with a series of small holes to allow the air to cool the trailing edge of the rotor web 18 directly at the highest temperature areas.

It is contemplated that the wave rotor combustor 10 reduces the temperature of the highest temperature portion of the wave rotor combustor 10 which allows higher exit gas temperatures with acceptable component life. The wave rotor combustor 10 allows the cooling of the rotor and transfer of heat from the rotor to the cooling air similar to a counter-flow heat-exchanger. The coolest cooling air is used to cool the highest temperature portions of the wave rotor combustor 10. The air is then used again to warm the cool end of the rotor. As a result, the overall rotor operates at a more uniform temperature, end to end, than would be the case if the cooling circuit were not in place. This provides uniform rotor growth both radially and axially which may yield thermal stability and enhance the end plate to rotor sealing on both ends of the wave rotor combustor 10.

The longitudinal passages in both the inner and outer tubes 16, 14 that are tied or interconnect with the passages through the thin hollow webs 18 allow the use of conventional core placement and common foundry practice using the lost wax process to produce the rotor. The geometry could be produced using virtual pattern casing technology or other metal addition forms of manufacture.

The passages permit the use of internal fins, pins, or turbulence enhancing projections to tailor the cooling to match the local heat load and minimize thermal gradients within the structure. The cored passages through the webs 18 may be single pass, two-pass, or other suitable arrangements to achieve the desired metal temperature distribution. The wave rotor combustor 10 lends itself to both an integral (one-piece) cored casting as well as a fabricated assembly of parts including the use of replaceable webs 18 with dovetail attachments or other suitable means to fasten the webs to the outer and inner tubes 14, 16.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wave rotor combustor comprising
an inlet plate formed to include an inlet port that extends circumferentially along an arc about a central axis of the wave rotor combustor,
an outlet plate formed to include an exit port that extends circumferentially along an arc about the central axis,
and a rotating rotor drum assembly mounted for rotation relative to the inlet and outlet plates about the central axis, the rotor drum assembly including an outer tube that extends along the central axis, an inner tube positioned radially between the outer tube and the central axis, and a plurality of webs extending radially between and interconnecting the outer and inner tubes to form a plurality of rotor passages, each web formed to include a plurality of fluid flow passages extending radially entirely through the web and adapted to receive conditioned air to regulate a temperature distribution of the rotor drum assembly, and each of the plurality of fluid flow passages being spaced apart axially from a neighboring one of the plurality of fluid flow passages, wherein each web includes a radial outer surface and a radial inner surface located radially between the radial outer surface and the central axis, the radial inner surface includes a plurality of web inlet apertures opening into the fluid flow passages, the radial outer surface includes a plurality of web outlet apertures opening into the fluid flow passages, wherein the rotor drum assembly includes:

(i) an insert body extending along the central axis and positioned radially between the inner tube and the central axis, and the insert body and the inner tube cooperate to form a first chamber and a third chamber, separate from the first chamber, in fluid communication with the fluid flow passages, (ii) a drum sleeve extending along the central axis to position the outer tube between the drum sleeve and the inner tube, and the drum sleeve and the outer tube cooperate to form a second chamber in fluid communication with the fluid flow passages to allow air to flow from the first chamber radially through the fluid flow passages into the second chamber, and (iii) the third chamber in fluid communication with the fluid flow passages to allow air to flow from the second chamber radially through the fluid flow passages into the third chamber.

2. The wave rotor combustor of claim 1, wherein the fluid flow passages are nonlinear.

3. The wave rotor combustor of claim 1, wherein the rotor drum assembly includes a forward end and an aft end spaced apart axially from the forward end along the central axis, each web further includes an aft sidewall extending between and interconnecting the radial outer and radial inner surfaces at the aft end, and each web is formed to include an exhaust passage extending between the radial inner surface and the aft sidewall.

4. The wave rotor combustor of claim 3, wherein the radial inner surface is formed to include an exhaust inlet aperture opening into the exhaust passage, the aft sidewall is formed to include a plurality of exhaust outlet apertures opening into the exhaust passage.

5. The wave rotor combustor of claim 1, wherein the outer tube is formed to include a plurality of outer openings that extend through the outer tube radially, the outer openings are spaced apart axially relative to the central axis, and each outer opening is aligned with and opens into a fluid flow passage.

6. The wave rotor combustor of claim 1, wherein the inner tube is formed to include a plurality of inner openings that extend through the inner tube radially, the inner openings are spaced apart axially relative to the central axis, and each inner opening is aligned with and opens into a fluid flow passage.

7. The wave rotor combustor of claim 1, wherein the second chamber is in fluid communication only with the fluid flow passages to cause air to flow from the first chamber through a first set of the fluid flow passages into the second chamber and from the second chamber through a second set of the fluid flow passages into the third chamber.

8. A wave rotor comprising a rotating rotor drum assembly arranged to rotate about a central axis of the wave rotor, the rotor drum assembly including an outer tube that extends along the central axis, an inner tube positioned radially between the outer tube and the central axis, and a plurality of webs extending radially between and interconnecting the outer and inner tubes to form a plurality of rotor passages, each web formed to include a plurality of fluid flow passages extending radially entirely through the web and adapted to receive conditioned air to regulate a temperature distribution of the rotor drum assembly, wherein each web includes a radial outer surface and a radial inner surface located radially between the radial outer surface and the central axis, the radial inner surface includes a plurality of web inlet apertures opening into the fluid flow passages, the radial outer surface includes a plurality of web outlet apertures opening into the fluid flow passages, the outer tube is formed to include a plurality of outer openings that are aligned with the plurality of fluid flow passages, and from which the conditioned cooling air is exhausted after passing through the plurality of fluid flow passages, and wherein the rotor drum assembly includes a forward end and an aft end spaced apart axially from the forward end along the central axis, each web further includes an aft sidewall extending between and interconnecting the radial outer and radial inner surfaces at the aft end, each web is formed to include an exhaust passage that extends between the radial inner surface and the aft sidewall, the exhaust passage is formed to include an inlet that opens into the radial inner surface and a plurality of outlets that open into the aft sidewall to allow fluid to enter the inlet, pass through the exhaust passage and exit the exhaust passage through the outlets.

9. The wave rotor of claim 8, wherein, the outer openings are spaced apart axially relative to the central axis, and each outer opening is aligned with and opens into a fluid flow passage.

10. The wave rotor of claim 8, wherein the inner tube is formed to include a plurality of inner openings that extend through the inner tube radially, the inner openings are spaced apart axially relative to the central axis, and each inner opening is aligned with and opens into a fluid flow passage.

11. The wave rotor of claim 8, wherein the rotor drum assembly includes an insert body extending along the central axis and positioned radially between the inner tube and the central axis and the insert body and the inner tube cooperate to form a first chamber in fluid communication with the fluid flow passages.

12. The wave rotor of claim 11, wherein the insert body includes a divider wall that extends radially outward relative to the central axis from the insert body between the inner tube and the insert body to form the first chamber and a third chamber in fluid communication with the fluid flow passages to allow air to flow radially inward relative to the central axis through the fluid flow passages into the third chamber.

13. The wave rotor of claim 8, wherein the rotor drum assembly includes a drum sleeve extending along the central axis to position the outer tube between the drum sleeve and the inner tube and the drum sleeve and the outer tube cooperate to form a second chamber in fluid communication with the fluid flow passages to allow air to flow radially outward relative to the central axis through the fluid flow passages into the second chamber.

14. The wave rotor of claim 8, wherein each of the plurality of fluid flow passages is spaced apart axially from a neighboring one of the plurality of fluid flow passages.

15. The wave rotor of claim 8, wherein each of the plurality of fluid flow passages is nonlinear.

16. A method of regulating a temperature distribution of a wave rotor combustor, the method comprising providing a rotating rotor drum assembly arranged to rotate about a central axis of the wave rotor combustor, the rotor drum assembly including a forward end, an aft end spaced apart from the forward end along the central axis, an outer tube, with radial flow exhaust openings, that extends along the central axis between the forward and aft ends, a drum sleeve surrounding the outer tube to form an outer air compartment, an inner tube positioned radially between the outer tube and the central axis, and a plurality of webs extending radially between and interconnecting the outer and inner tubes to form a plurality of rotor passages, each web formed to include a plurality of fluid flow passages extending radially entirely through each web and adapted to receive conditioned air, supplying conditioned air to the plurality of fluid flow passages near the aft end of the rotor drum assembly to cool the aft end of the rotor drum assembly and provide heated conditioned air, and collecting in the outer air compartment the heated conditioned air exiting the fluid flow passage which passes through the radial flow exhaust openings near the aft end of the rotor drum assembly and supplying the heated collected conditioned air to the plurality of fluid flow passages in the webs near the forward end of the rotor drum assembly, ejecting an additional supply of heated conditioned air from additional cooling passages that are used to cool an aft trailing edge of the plurality of webs and are ejected in a generally axial direction, relative to the central axis.

* * * * *